(12) United States Patent
Steblau

(10) Patent No.: US 9,638,250 B2
(45) Date of Patent: May 2, 2017

(54) CAGE FOR A CRANKSHAFT BEARING OR CONNECTING-ROD BEARING OF AN INTERNAL COMBUSTION ENGINE OR OF A COMPRESSOR

(71) Applicant: Dieter Steblau, Schweinfurt (DE)

(72) Inventor: Dieter Steblau, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/926,937

(22) Filed: Oct. 29, 2015

(65) Prior Publication Data

US 2016/0123392 A1    May 5, 2016

(30) Foreign Application Priority Data

Oct. 29, 2014    (DE) .................. 10 2014 222 096

(51) Int. Cl.
| | |
|---|---|
| *F16C 33/46* | (2006.01) |
| *F16C 33/50* | (2006.01) |
| *F16C 9/02* | (2006.01) |
| *F16C 9/04* | (2006.01) |
| *F16C 19/46* | (2006.01) |
| *F16C 19/26* | (2006.01) |

(52) U.S. Cl.
CPC ........ *F16C 33/504* (2013.01); *F16C 33/4623* (2013.01); *F16C 9/02* (2013.01); *F16C 9/04* (2013.01); *F16C 19/26* (2013.01); *F16C 19/463* (2013.01); *F16C 2226/74* (2013.01)

(58) Field of Classification Search
CPC .............. F16C 33/3812; F16C 33/3862; F16C 33/3875; F16C 33/4641; F16C 33/4652; F16C 33/504; F16C 2226/74
See application file for complete search history.

(56) References Cited

U.S. PATENT DOCUMENTS

| | | | |
|---|---|---|---|
| 4,239,304 A | 12/1980 | Wakunami | |
| 4,397,507 A * | 8/1983 | Kraus | ................ F16C 33/4635 |
| | | | 384/576 |

(Continued)

FOREIGN PATENT DOCUMENTS

| | | | |
|---|---|---|---|
| DE | 10112737 | * | 6/2002 |
| DE | 10302002 A1 | | 7/2004 |

(Continued)

OTHER PUBLICATIONS

Translation of DE1012737 obtained Oct. 24, 2016.*

*Primary Examiner* — James Pilkington
(74) *Attorney, Agent, or Firm* — Bryan Peckjian; SKF USA Inc. Patent Dept.

(57) ABSTRACT

A cage for a crankshaft bearing or a connecting-rod bearing of an internal combustion engine or for a compressor has a plurality of receiving pockets for guiding bearing rolling elements and has an axial width. The cage includes at least first and second cage segments, each cage segment having a segment axial width equal to the axial width of the cage and having a first end circumferentially spaced from a second end, the first cage segment first end being connected to the second cage segment second end by an interference fit and the first cage segment second end being connected to the second cage segment first end by an interference fit.

10 Claims, 3 Drawing Sheets

(56) References Cited

U.S. PATENT DOCUMENTS

| | | | | |
|---|---|---|---|---|
| 5,630,669 | A * | 5/1997 | Stewart | F16C 33/504 384/570 |
| 9,249,832 | B2 * | 2/2016 | Friedrich | F16C 33/504 |
| 2015/0131935 | A1 * | 5/2015 | Katayama | F16C 33/504 384/570 |

FOREIGN PATENT DOCUMENTS

| | | |
|---|---|---|
| DE | 102009037420 A1 | 2/2011 |
| DE | 102011082809 A1 | 3/2013 |
| JP | H10-281165 A | 10/1998 |
| JP | 2007-224953 A | 9/2007 |
| JP | 2007-285507 A | 11/2007 |
| JP | 2009-138862 A | 6/2009 |
| JP | 2009191990 A | 8/2009 |
| JP | 2012017789 A | 1/2012 |
| JP | 2013156483 A | 8/2013 |
| WO | 2013175922 A1 | 11/2013 |

* cited by examiner

CAGE FOR A CRANKSHAFT BEARING OR CONNECTING-ROD BEARING OF AN INTERNAL COMBUSTION ENGINE OR OF A COMPRESSOR

CROSS-REFERENCE

This application claims priority to German patent application no. 10 2014 222 096.3 filed on Oct. 29, 2014, the contents of which are fully incorporated herein by reference.

TECHNOLOGICAL FIELD

The disclosure is directed to a cage for a bearing of a crankshaft or a connecting-rod of an internal combustion engine or a compressor. The bearing comprises a plurality of rolling elements retained by the cage and is configured to support first and second mutually rotatable components. The cage has a plurality of receiving pockets for the rolling elements.

BACKGROUND

Sliding bearings are typically used to support crankshaft bearing journals and connecting rods in internal combustion engines and/or compressors. Rolling-element bearings may also used in these locations, and when a rolling-element bearing is used, that bearing requires a cage for guiding the rolling elements.

In single-cylinder motors or single-cylinder compressors a solid cage may be used, and it is generally not necessary to use a multi-piece or split cage. In such case the bearing assembly can include one or more needle roller and cage assemblies. In situations where radial installation is not possible, a split bearing assembly may be employed.

A sliding bearing is generally provided in single- and multiple-cylinder motors or compressors. Split cages that can be assembled when they are installed in a bearing may be used in highly specialized applications, engines in race cars, for example. Disadvantageously, these cages are very difficult to assemble. Furthermore, conventional multi-part cages may created more noise than one-piece cages and may provide less than adequate control over the movement of the rolling elements. Furthermore splitting a conventional needle roller and cage assembly may weaken the cage.

SUMMARY

A first aspect of the disclosure is to provide a cage for a crankshaft bearing or connecting rod bearing that is simple to install and is highly stable so that rolling elements in the cage can be guided very precisely.

In the present disclosure, the cage is comprised of at least two circumferential cage segments connected to one another by interference fit at joints/junctions that are spaced apart in the circumferential direction. The cage may comprise, for example, first and second generally semicircular cage segments joined together at their ends.

The cage is preferably formed by exactly two cage segments.

Moreover, the interference-fit connection is preferably configured in the manner of a clip connection. That is, the connection preferably comprises at least one hook-shaped projection on each cage segment and at least one complimentary recess in the other cage segment that engages the at least one hook-shaped segment. Each cage segment preferably includes at least one hook-shaped projection at a first segment end and at least one complimentary recess circumferentially spaced from the first segment end at a second segment end.

The circumferentially spaced first and second end regions of each cage segment alternately may each include two hook-shaped projections that face in radially opposite directions, each of the two hook-shaped projections being located in different axially adjacent regions of the first segment end and the second segment end. The two axial regions each preferably extend over half of the axial extension of the cage segment.

The interference-fit connections at the joints preferably result in an uninterrupted hollow-cylindrical shape when the cage segments are assembled.

All cage segments are preferably configured to have the same shape; in other words, they are substantially identical. It is particularly advantageous if the cage segments are manufactured by an injection molding process.

The rolling elements placed in the cage are preferably cylindrical rollers or needles.

Using the disclosed concept, the assembly of a roller and cage assembly, or a needle roller and cage assembly, in particular for a connecting-rod bearing on the gudgeon pin (wrist pin) or on the crankshaft is made significantly easier. In the disclosed configuration, the cage segments can be assembled in a simple manner using a locking mechanism via which the cage segments latch to one another and thus form a relatively stable structure. Accordingly disassembly is also possible in a simple manner.

It is very advantageous that the cage halves are identical. This allows the two cage segments to be formed by a single injection mold.

The bearing outer ring of the rolling-element bearing that is provided with the inventive cage can be formed by a connecting rod or a connecting rod end or by the crankshaft housing itself. The bearing outer ring thus does not need to be a component separate from the crankshaft and/or connecting rod. In this case the bore in the connecting rod or in the crankshaft housing is or forms a raceway for the rolling elements.

The disclosed bearing assembly may be particularly useful in crankshafts of internal combustion engines, where the bearing journals of the crankshaft itself and/or the bearing journals of the connecting rod are embodied. However, it is also possible to support the camshaft of the internal combustion engine in the same way. In the latter case the bearings in the camshaft in the cylinder head can be embodied in a corresponding way.

The disclosed design provides a higher degree of cage stability and thus also provides for stable guiding of the rolling elements so that a relatively low bearing friction is achieved.

Furthermore, using the disclosed design a simple assembly is advantageously achieved that only generates a relatively low level of noise during operation. In addition, the disclosed design provides a cost-effective solution that is realizable using different materials.

BRIEF DESCRIPTION OF THE DRAWINGS

An exemplary embodiment of the disclosure is depicted in the drawings.

DETAILED DESCRIPTION

Figure 1:
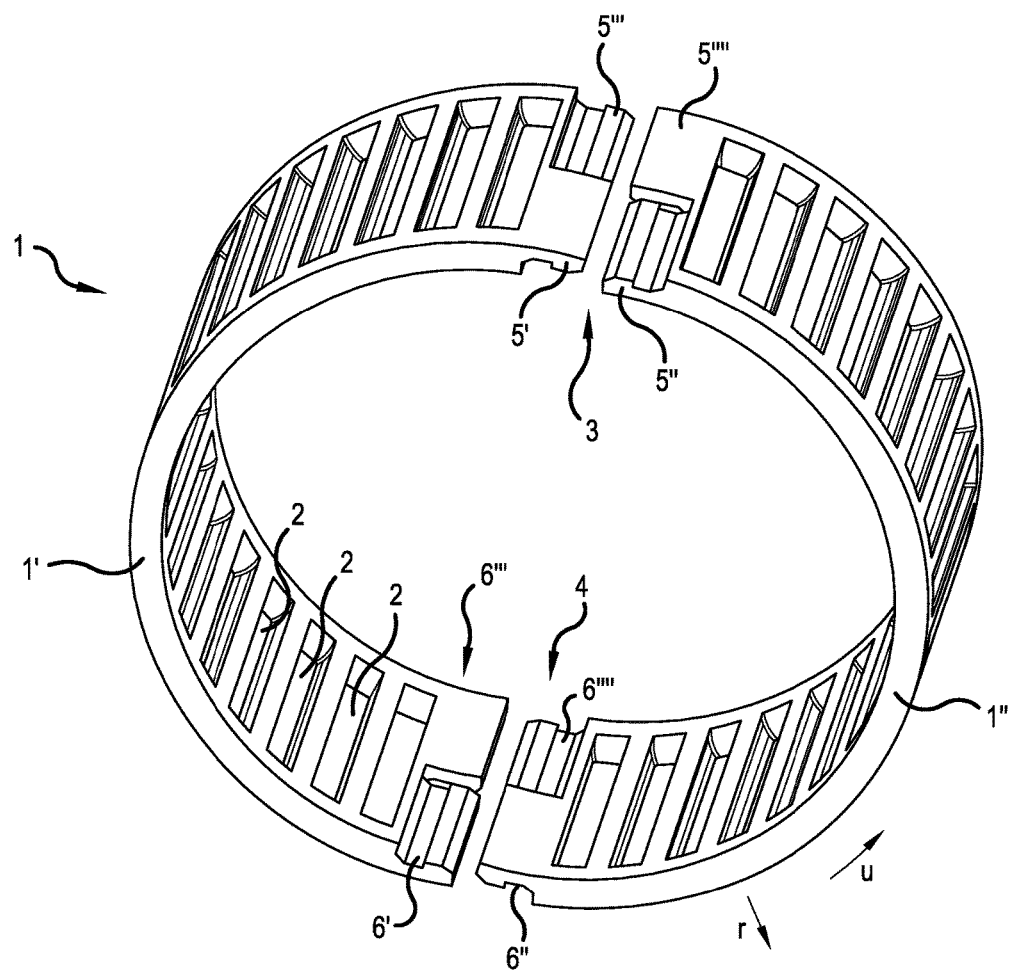
FIG. 1 is an exploded perspective view of a cage for a crankshaft bearing assembly formed of two cage segments.

FIG. 1 illustrates a cage 1 comprising two cage segments 1' and 1", which when joined form the cage 1. In this embodiment the two cage segments 1', 1" are identical; for example, they may be produced by the same injection mold.

The cage 1 includes receiving pockets 2 for rolling elements (not illustrated).

Figure 2:
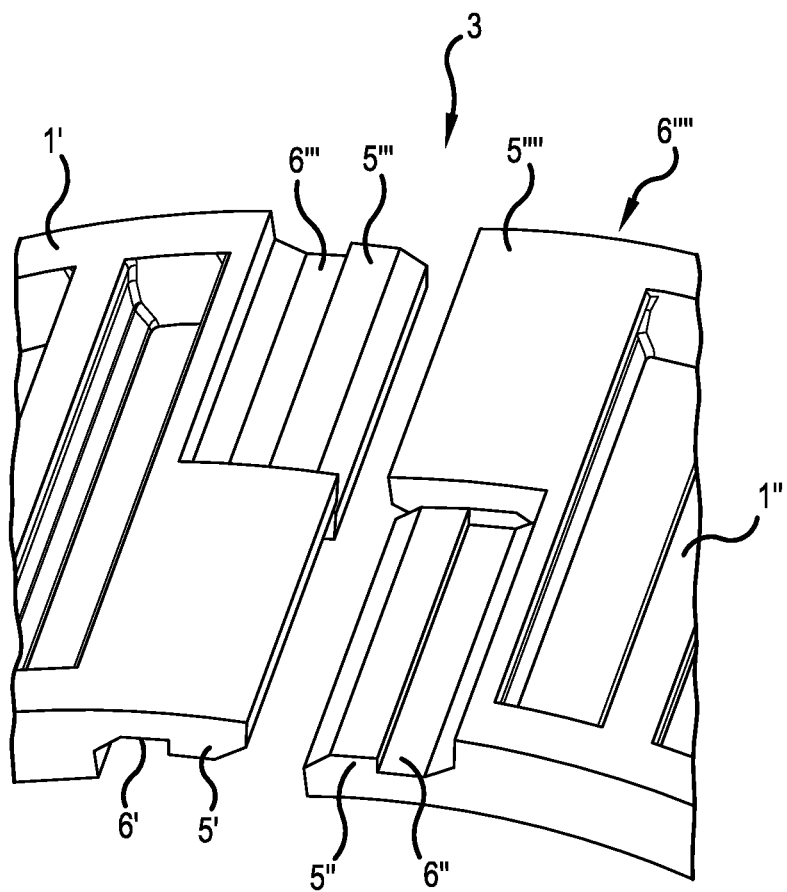
FIG. 2 is an enlarged section of one of the joints of FIG. 1.

The two cage segments 1', 1" can be joined at first and second joints 3 and 4 that are circumferentially offset from each other by about 180°. The connection between the cage segments 1' and 1" at the first and second joints 3, 4 is effected by an interference-fit connection in the manner of a clip connection as shown in detail in FIGS. 2 and 3.

Figure 3:
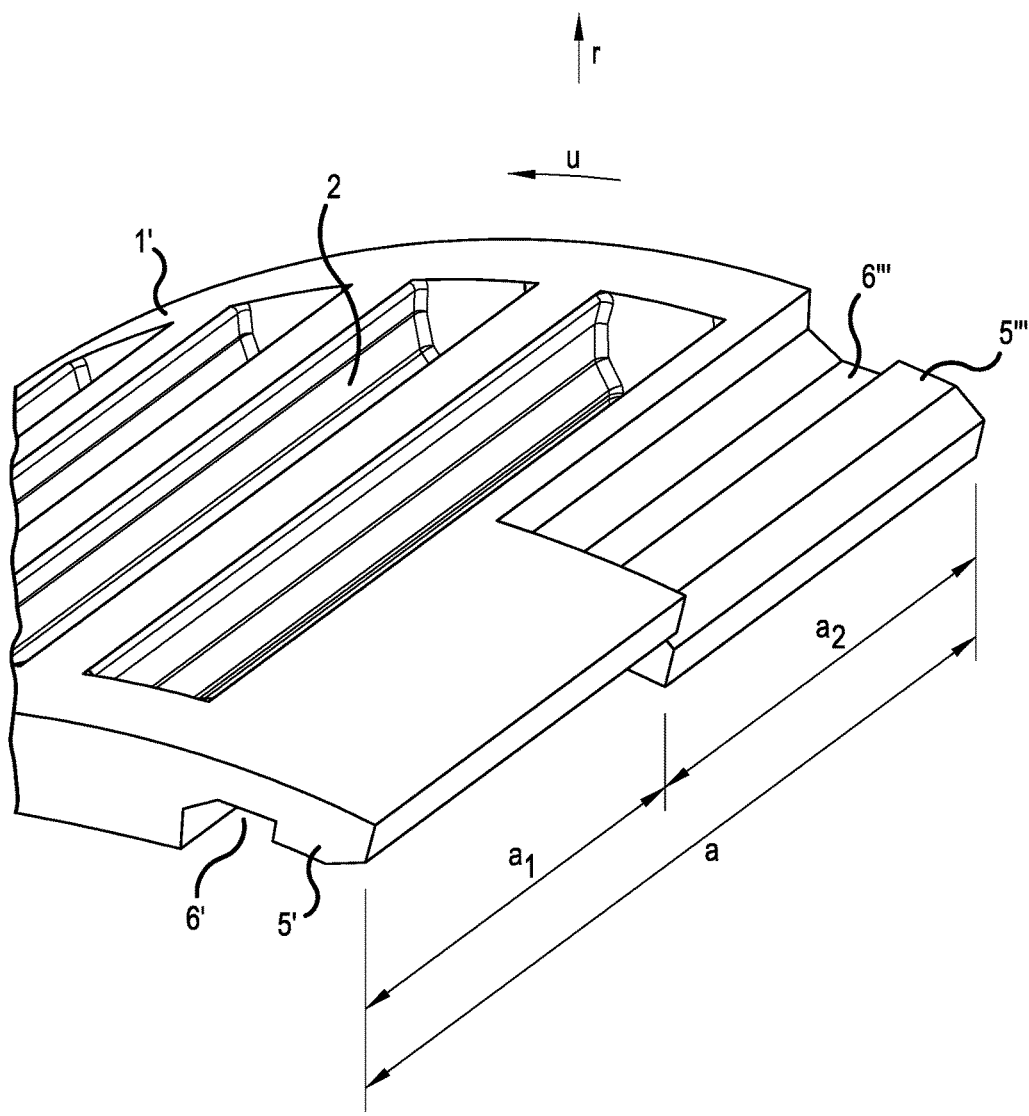
FIG. 3 is an enlarged perspective view of an axial end region of one of the cage segments.

As illustrated in FIG. 3, the circumferentially spaced ends of each cage 1' and 1" each extend generally in an axial direction and can be thought of as having first and second adjacent axial regions $a_1$ and $a_2$. The axial regions preferably have the same length—that is, the end faces of the cage segments are divided axially in half.

Hook-shaped projections 5', 5", 5''', and 5'''' are disposed in the first and second axial regions $a_1$ and $a_2$ and recesses 6', 6", 6''', and 6'''' are disposed respectively adjacent to these hook-shaped projections 5', 5", 5''', and 5''''. As can be seen from the figures, the end regions of the two cage segments 1', 1", can be pushed onto each other as the two ring segments are pushed together to form a ring, so that simultaneously:

the hook-shaped projection 5' latches into the recess 6",
the hook-shaped projection 5" latches into the recess 6',
the hook-shaped projection 5''' latches into the recess 6'''', and
the hook-shaped projection 5'''' latches into the recess 6'''.

This results in an uninterrupted hollow-cylindrical section in the region of the joints 3, 4, and a stable cage comprising the first and second cage segments 1', 1". At a given end of one of the cage segments, the projections, e.g., 5' in the first axial region $a_1$ extend in a radially opposite direction from the projections, e.g., 5''' in the second axial region $a_2$. The hook-shaped projections may also be described as hooks that have hook end portions and bights; that is, the aforementioned recesses may be described as bights or bight portions of a hook-shaped structure.

As will be appreciated from the figures, each cage segment has two snap lugs (projections) on each circumferential end. The cage is radially mountable on any shaft by simply pressing the two cage segments against each other until they snap together. The locking mechanism substantially prevents movement, and no special device is required for holding the two cage halves together during assembly in the housing or with connecting rod installation.

The bearing described is preferably used at a location for supporting the crankshaft in the housing of an internal combustion engine. The bearing can be used in the same way to support either end of a connecting rod including at its big-end bore (eye) on the journal which is a component of the crankshaft.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Cage
1' Cage segment
1" Cage segment
2 Receiving pocket
3 Joint
4 Joint
5' Hook-shaped projection
5" Hook-shaped projection
5'''' Hook-shaped projection
5''' Hook-shaped projection
6' Recess
6" Recess
6''' Recess
6'''' Recess
$a_1$ First axial region
$a_2$ Second axial region
a Axial extension of the cage/cage segment
U Circumferential direction
r Radial direction

What is claimed is:

1. A cage for a crankshaft bearing or a connecting-rod bearing of an internal combustion engine or for a compressor, the cage comprising a plurality of receiving pockets for guiding bearing rolling elements and having an axial width,
wherein, the cage includes at least one first cage segment and at least one second cage segment, each cage segment having a segment axial width equal to the axial width of the cage and having a first end circumferentially spaced from a second end, the first cage segment first end being connected to the second cage segment second end by an interference fit, and the first cage segment second end being connected to the second cage segment first end by an interference fit,
wherein the first cage segment first end includes at least one projection and the second cage segment second end includes at least complementary recess, the projection being received in the recess,
wherein the first cage segment first end includes a first axial portion and a second axial portion, and wherein the at least one projection of the first cage segment comprises a radially inwardly facing projection on the first axial portion and a radially outwardly facing projection on the second axial portion, wherein the first axial portion extends axially inward from a first side of the first cage segment and the second axial portion extends axially inward from a second side of the first cage segment, wherein an axial width of the first axial portion is equal to an axial width of the second axial portion and equal to one half the axial width of the cage segment, and wherein the at least one projection of the first cage segment first end fills the complementary recess of the second cage segment second end.

2. The cage according to claim 1, wherein the cage comprises no cage segments other than the first cage segment and the second cage segment.

3. The cage according to claim 1, wherein the interference-fit connection is a clip connection.

4. The cage according to claim 1, wherein the first cage segment first end includes a recess circumferentially spaced from the at least one projection.

5. The cage according to claim 1, wherein the first cage segment is identical to the second cage segment.

6. The cage according to claim 1, wherein the bearing rolling elements are cylindrical rollers or needle rollers.

7. The cage according to claim 1, wherein a circumferential end of the at least one projection of the first cage segment is chamfered.

8. A bearing comprising:
a bearing inner ring;
a bearing outer ring;
a cage according to claim 1; and
a plurality of roller elements mounted in the receiving pockets.

9. A cage for a crankshaft bearing or a connecting-rod bearing of an internal combustion engine or for a compressor, the cage comprising a plurality of receiving pockets for guiding bearing rolling elements and having an axial width, wherein, the cage includes a first cage segment and a second cage segment, the second cage segment being substantially identical to the first cage segment, each of the first and second cage segments comprising:

a first end and a second end circumferentially spaced from the first end, the first end including a first axial portion and a second axial portion, the first axial portion including a first hook having a hook end and a radially outward facing bight and the second axial portion including a second hook having a hook end and a radially inwardly facing bight, the second end including a first axial portion and a second axial portion, the first axial portion of the second end including a third hook having a hook end and a radially inwardly facing bight and the second axial portion of the second end including a fourth hook having a hook end and a radially outwardly facing bight, wherein the hook end of the of the first hook of the first cage segment is received in and fills the bight of the third hook of the second cage segment and wherein the hook end of the second hook of the first cage segment is received in and fills the bight of the fourth hook of the second cage segment, wherein the bight of the first hook extends axially inward from an axially outer side of the first cage segment, wherein the hook end of the first hook has an axial width equal to an axial width of the bight of the first hook, and wherein the axial width of the hook end of the first hook is equal to one half the axial width of the cage.

10. The cage according to claim 9, wherein the hook end of the first hook has a chamfered portion spaced from the bight of the first hook.

* * * * *